United States Patent [19]

Byszewski et al.

[11] Patent Number: 5,352,345
[45] Date of Patent: Oct. 4, 1994

[54] ION EXCHANGE RESIN REGENERANT WASTE RECOVERY AND RECYCLING VIA BIPOLAR MEMBRANES

[75] Inventors: Carolyn Byszewski, Morris; John C. McArdle; Krishnamurthy N. Mani, both of Somerset, all of N.J.

[73] Assignee: AlliedSignal Inc., Morris Township, Morris County, N.J.

[21] Appl. No.: 946,728

[22] Filed: Sep. 18, 1992

Related U.S. Application Data

[63] Continuation of Ser. No. 696,686, May 7, 1991, abandoned.

[51] Int. Cl.$^5$ ................... B01D 61/44; C02F 1/469
[52] U.S. Cl. ..................... 204/182.4; 204/182.5; 204/151; 210/670
[58] Field of Search .............. 204/182.4, 182.5, 151; 210/670

[56] References Cited

U.S. PATENT DOCUMENTS

| | | | |
|---|---|---|---|
| 2,678,288 | 2/1950 | Cotton et al. | 210/77 |
| 3,547,810 | 5/1968 | Cooper | 204/182.5 |
| 3,788,960 | 2/1973 | Datil et al. | 210/677 |
| 3,791,866 | 2/1974 | Kunin et al. | 210/677 |
| 3,905,903 | 9/1975 | David | 210/675 |
| 4,116,889 | 9/1978 | Chlanda et al. | 521/27 |
| 4,219,396 | 8/1980 | Gancy et al. | 204/182.5 |
| 4,391,680 | 7/1983 | Mani et al. | 210/638 |
| 4,738,764 | 4/1988 | Chlanda et al. | 204/296 |
| 4,740,281 | 4/1988 | Chlanda et al. | 204/151 |
| 4,880,513 | 11/1989 | Davis et al. | 204/182.4 |
| 4,976,838 | 12/1990 | Mani et al. | 204/182.3 |
| 4,995,956 | 2/1991 | Mani | 204/182.3 |

FOREIGN PATENT DOCUMENTS 125652  10/1976  Japan.

OTHER PUBLICATIONS

"Electrodialysis for Recovering Acid and Caustic from Ion-Exchange Regeneration Wastes" Industrial & Engineering Chem Product Research & Development, Babu R. Nott. vol. 20, Mar. 1981, pp. 170–177.

*Primary Examiner*—John Niebling
*Assistant Examiner*—Arun S. Phasge
*Attorney, Agent, or Firm*—Karen A. Harding; Jay P. Friedenson

[57] ABSTRACT

The present invention provides an improved process for the regeneration of ion exchange gels and resins. Exhausted regenerating solutions from a either a cationic or anionic exchange column are converted into fresh regenerating solutions via one or a combination of electrodialysis units having at least one bipolar membrane. The spent regenerants may be treated in an electrodialytic water splitter, an acid or base purification unit, or any combination thereof, to reclaim as much or as little of the regenerating solution as is required by the particular process.

15 Claims, 3 Drawing Sheets

ION EXCHANGE RESIN REGENERANT WASTE RECOVERY AND RECYCLING VIA BIPOLAR MEMBRANES

RELATED U.S. APPLICATION DATA

This application is a continuation of U.S. application Ser. No. 696,686 filed May 7, 1991, now abandoned.

BACKGROUND OF THE INVENTION

High purity water is required for many industrial and utility applications including process feed water, high purity rinse water for electronic components, and demineralized water for steam turbines.

Also, many aqueous feedstocks or products must meet contamination specifications requiring ion exchange polishing to remove the undesired ionic species. The chemical process streams in amino acid production, corn (high fructose corn syrup production) and sugar refining, pharmaceutical manufacture, hydro-metallurgical production, and boiler feed water treatment are a few examples.

Typically, such purity requirements are met on an industrial scale by using large ion exchange beds, often in the range of 250 ft$^3$. Each bed is filled with ion exchange resin. When a solution containing cation impurities like $Na^+$, $Ca^{2+}$, $Mg^{2+}$, or $Al^{3+}$ is passed through a cation exchange bed, $H^+$ from the cation exchange resin replaces the cationic impurities present in the solution, and the impurities are left behind in the ion exchange bed. When the available $H^+$ has been exchanged, the resin is "spent" and must be replaced or regenerated.

Similarly, in an anion exchange column, $OH^-$ is replaced by anionic impurities like $Cl^-$, $SO_4^{2-}$. When the available $OH^-$ has been exchanged, the anion exchange resin is "spent" and must be replaced or regenerated.

A cation exchange column is regenerated by passing a strong acid, usually HCl or $H_2SO_4$ over the bed. The $Cl^-$ or $SO_4^{2-}$ picks up the cationic impurities from the spent resin bed, and leaves behind fresh $H^+$. Similarly, an anion exchange column is regenerated by passing a strong base, usually NaOH, over the anion exchange beds. An excess (up to ten percent or more of the exchange capacity) of the regenerant is used in order to insure complete regeneration. In a typical water demineralization plant large quantities of acid and base are used, resulting in large quantities of salt and dilute acid or dilute alkali in the exhausted regenerant waste streams. Disposal of such waste streams, especially the anionic waste regenerant is environmentally undesirable, and the acid and base used to regenerate the exchange beds are costly. Moreover, prior art processes require storage of large quantities of acid, base or salt.

U.S. Pat. No. 4,880,513 discloses using a three compartment electrodialytic water splitter to generate HCl and NaOH for use as regenerant for ion exchange resins. Spent anion and cation regenerant may either be thrown away, or mixed and added to the constantly recirculating salt loop of the water splitting process. However, this process requires the purchase of large quantities of feed salt (NaCl) which is used to generate and maintain the circulating salt solution at a specified concentration. This process also requires pretreatment of the salt solution to remove $Ca^{2+}$ and $Mg^{2+}$.

U.S. Pat. No. 4,976,838 discloses a multi chamber two compartment base purification unit and a method for using the same for the purification of a base from a stream containing free base in a salt solution. Further, U.S. application, Ser. No. 278,062 (filed Nov. 30, 1988) discloses a multichamber, two compartment acid purification unit and a method for using the same to separate and purify a strong acid from a feed stream containing free acid and salt. Processes for producing acid and base from the depleted salt in a three compartment water splitter are also disclosed in U.S. Pat. No. 41,740,281.

Electrodialysis units used for salt concentration or desalination are also known. U.S. Pat. No. 4,995,956 discloses a two compartment electrodialysis unit and method for using the same to regulate the concentration of the salt stream fed into an electrodialytic water splitter.

However, the previously existing processes have several drawbacks. Mixing of anion and cation regenerants prior to treatment results in further dilution of the spent regenerant solution, increased pretreatment steps and costs, and a corresponding decrease in membrane life, especially in the case of cation membranes which are particularly susceptible to fouling by insoluble cation salts. Moreover, when exhausted regenerants are combined an excess of acid is produced which must be stored or purified and concentrated for sale. The use of a constantly circulating salt solution, with a fixed concentration requires the addition of large amounts of extraneous salts, which increases the pretreatment steps, the cost of running the process, as well as the amount of feed which needs to be treated.

Furthermore, the existing processes provide little freedom for adaptation to various ion exchange process needs and, none of the above references discloses a method for substantially minimizing the total regenerants and regenerant precursors (such as solid salt) which must be purchased and stored. In short, a simplified purification process capable of ready integration into a variety of ion exchange processes was heretofore unknown.

DETAILED DESCRIPTION OF THE INVENTION

Exhausted regenerating solutions from a single type of ion exchange column are converted into fresh regenerating solutions via treatment in one or a combination of electrodialytic units having at least one bipolar membrane. The spent regenerants may be treated in an electrodialytic water splitter, an acid or base purification unit, or any combination thereof, to reclaim as much or as little of the regenerating solution as is required by the particular process. For example, processes utilizing only anion exchange columns, a base purification unit may be used to minimize the amount of acid coproduct generated. Alternatively, where acid is a desired coproduct, the base purification unit may be used with an electrodialytic water splitter run in series. If only cation exchange columns are present an acid purification unit may be used either by itself or in series with an electrodialytic water splitter to provide acid or acid and base coproduct respectively. For processes using both cation and anion exchange columns virtually all of the regenerant requirements may be generated by treating only the anionic waste regenerant in a three compartment water splitter, or a two compartment base purification unit and three compartment water splitter in series.

Specifically the present invention discloses a method for recovering acid and base from exhausted resin regenerant comprising: withdrawing said exhausted resin regenerant from an anion exchange column; subjecting said exhausted resin regenerant consisting essentially of exhausted anion resin regenerant to treatment in a three compartment electrodialytic water splitter having at least one bipolar ion exchange membrane to produce an electrodialytically depleted regenerant solution and an amount of acid and base which is about equal to the amount required to regenerate said anion exchange column and a cation exchange column.

In the first embodiment, spent anion exchange regenerant is withdrawn from the anion exchange bed. The regenerant stream contains anionic contaminants such as chlorides, sulfates, phosphates, $SiO_2$ and organics. The regenerant stream is pretreated to remove insoluble contaminants such as $SiO_2$, organics, and if necessary, phosphates. Preferred types of pretreatment include pH adjustment to a pH of 5-6 to precipitate the insolubles, microfiltration to remove any remaining insolubles, and treatment in a carbon bed to remove any dissolved organics. The treated spent regenerant stream may be fed to the three compartment water splitter of FIG. 1.

Figure 1:
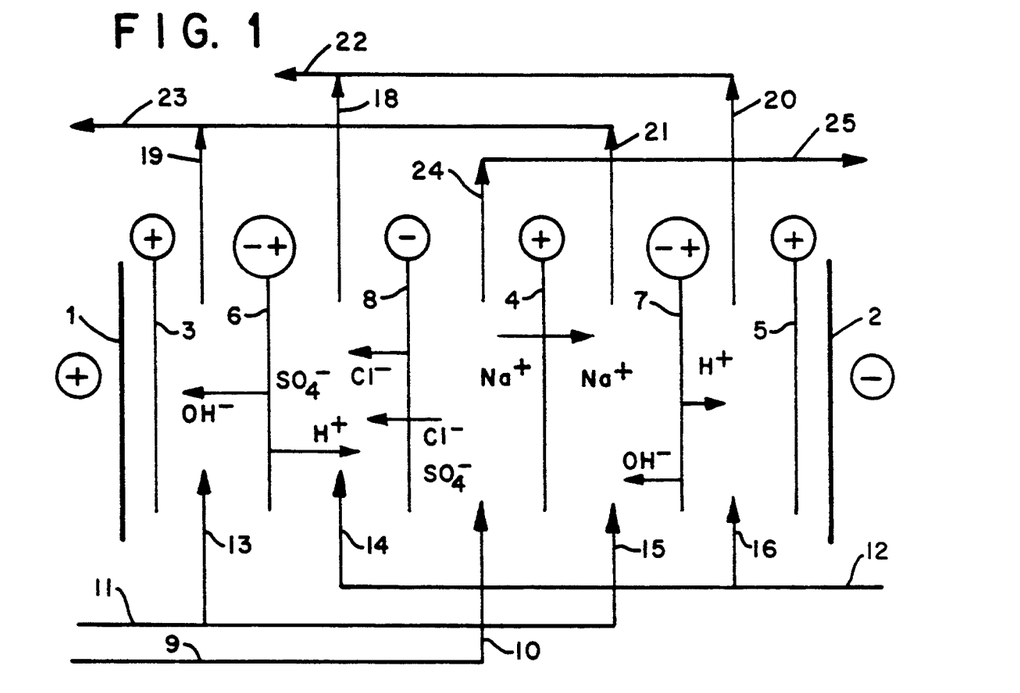
FIG. 1 is a schematic drawing of a 3-compartment water splitter useful for splitting the salts of an ion exchange regenerant waste stream into their acid and base counterparts.

Cation membranes, 3 and 5, separate the anode, 1, and the cathode, 2, from the membranes which form the electrodialytic cell. There is an acid compartment between the cation layer of bipolar membrane, 6, and anion membrane, 8; a salt compartment between anion membrane, 8, and cation membrane, 4; and a base compartment between cation membrane, 4, and the anion layer of bipolar membrane, 7. Bipolar membranes, 6 and 7, form the outer boundaries of the cell. Thus, a single cell, having an acid, salt and base compartments is shown. In actual use there are several repeating cells (preferably between 50 and 200 ) between each set of electrodes. Bipolar membrane 7, besides being the second bipolar membrane of the cell shown in FIG. 1, is also the first bipolar membrane of the second cell (not shown).

The spent regenerant solution is introduced to the water splitter via line 9, and fed into the salt compartment via line 10. Aqueous solutions are introduced to the cell stack via lines 11 and 12. The aqueous solutions are fed into the acid and base compartments via lines 14 and 16, and lines 13 and 15, respectively. The aqueous solutions are preferably water, or a dilute acid or base solution fed respectively to the acid and base compartments. When a direct current is passed across the water splitter, cations will migrate toward the cathode and anions will migrate toward the anode. The bipolar membranes split water into $H^+$ and $OH^-$. The cation membrane allows cations to pass through, but acts as a barrier to anions, and the anion membrane allows anions to pass through but acts as a barrier to cations. Thus, under the influence of a direct current, the anions in the salt compartment migrate across anion membrane, 8, into the acid compartment, and combine with the hydrogen ions generated by bipolar membrane, 6, to form acid. Similarly, the cations in the salt compartment migrate across cation membrane, 4, into the base compartment and form base with the hydroxide ions generated by bipolar membrane, 7. Acid and base are respectively formed in the compartments formed between the cation layer of bipolar membrane, 7, and cation membrane, 5, and anion membrane, 8 and the anion layer of bipolar membrane, 6. The acid formed in the unit is removed via lines 18 and 20 and recovered via line 22. The base formed in the unit is removed via lines 19 and 21 and recovered via line 23. Depleted salt solution is removed from the unit via line 24 and recovered via line 25.

The spent regenerant may be processed in the water splitter via any conventional method, i.e. continuous, batch or "feed and bleed" mode. In the "feed and bleed" mode, the feed and withdrawal rates are varied to keep the solution being treated at a certain characteristic, (i.e. pH, conductivity or volume).

Suitable anion membranes for use in the above described water splitter are AAV, ASV or AMV made by Asahi Glass, or Ionics 204-UZL-386 anion membranes. Examples of useful bipolar membranes are disclosed in U.S. Pat. No. 4,116,889, and made by Allied-Signal, Inc. Examples of suitable cation membranes are disclosed in U.S. Pat. No. 4,738,764 and made by Allied-Signal, Inc., CMV cation membranes, which are commercially available from Asahi Glass, or Nafion ® membranes which are commercially available from Dupont.

Spent regenerant solution frequently has a salt concentration below 2N and an excess regenerant concentration of 0.1 –0.5N. Accordingly, the spent regenerant may be concentrated via treatment in a reverse osmosis unit (not shown), or the electrodialysis unit of FIG. 2, having alternating anion and cation membranes (105, and 107, and 104, 106 and 108 respectively) disposed between an anode, 101, and cathode, 102. The dilute salt solution is fed into the electrodialysis unit via line, 112, and to the diluting compartments (located between membranes 105 and 106; and membranes 107 and 108 respectively) via lines 114, and 116. An aqueous solution is fed to the electrodialysis unit via line 111, and into the concentrating compartments (located between membranes 104 and 105; and membranes 106 and 107 respectively) via lines 113, and 115. The aqueous solution fed to the concentrating compartments may be water, or previously concentrated salt solution. When a current is passed between the electrodes, cations migrate toward the cathode, and across cation membranes, but are blocked by anion membranes. Similarly, anions migrate across the anion membranes, toward the anode, but their migration is blocked by cation membranes. Thus, anions and cations migrate from the dilute salt feed compartments, and are trapped in the concentrating compartments.

Figure 2:
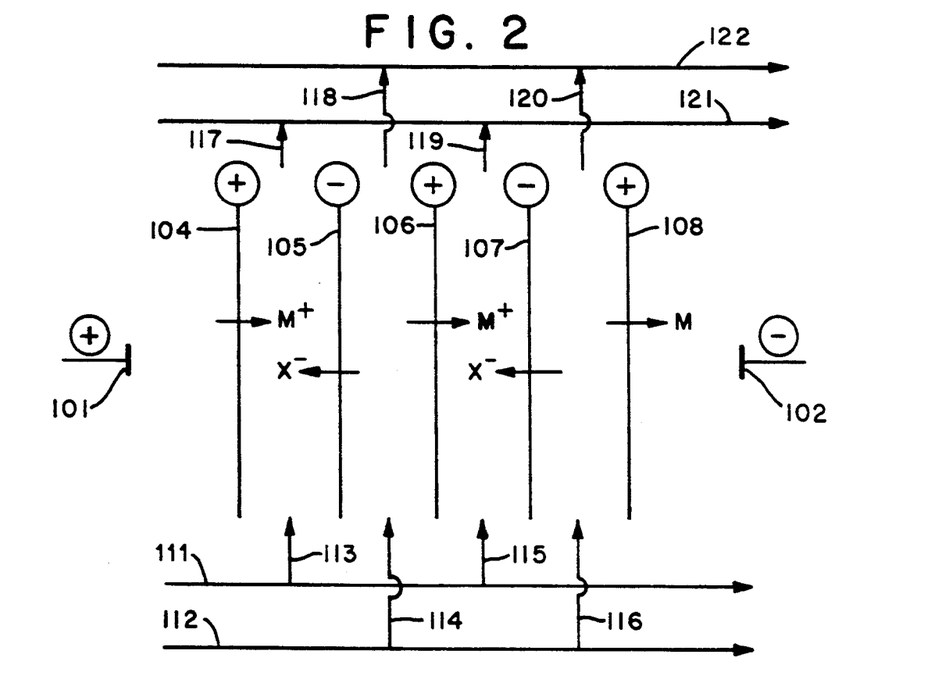
FIG. 2 is a schematic drawing of an electrodialysis unit which may be used to concentrate ion exchange resin regenerants prior to their treatment in either an electrodialytic water splitter or an acid or base purification unit.

Concentrated salt solution is withdrawn from the concentrating compartments via lines 117 and 119, and removed from the unit via line 121. The salt depleted solution is withdrawn from the diluting compartments via lines 118 and 120, and removed from the unit via line 122.

Preconcentration, although not critical when single regenerant species are treated separately, increases the efficiency of the present process. Preconcentration of the exhausted regenerant solutions decreases the volume of solution which must be treated in electrodialytic water splitter, and thus helps to reduce pretreatment and processing costs.

Electrodialysis and reverse osmosis may also be used to recover surplus water from the electrodialytically depleted salt stream. The recovered water may be used as make-up at various stages of the process of the present invention.

Alternatively, a base purification unit may be used to recover the excess base which remains after regenerating an anion exchange column. Use of a base purification unit is particularly useful when the amount of free base in the regenerant stream exceeds about 20%. In this embodiment, spent anion exchange regenerant is fed into the base purification unit of FIG. 3.

Figure 3:
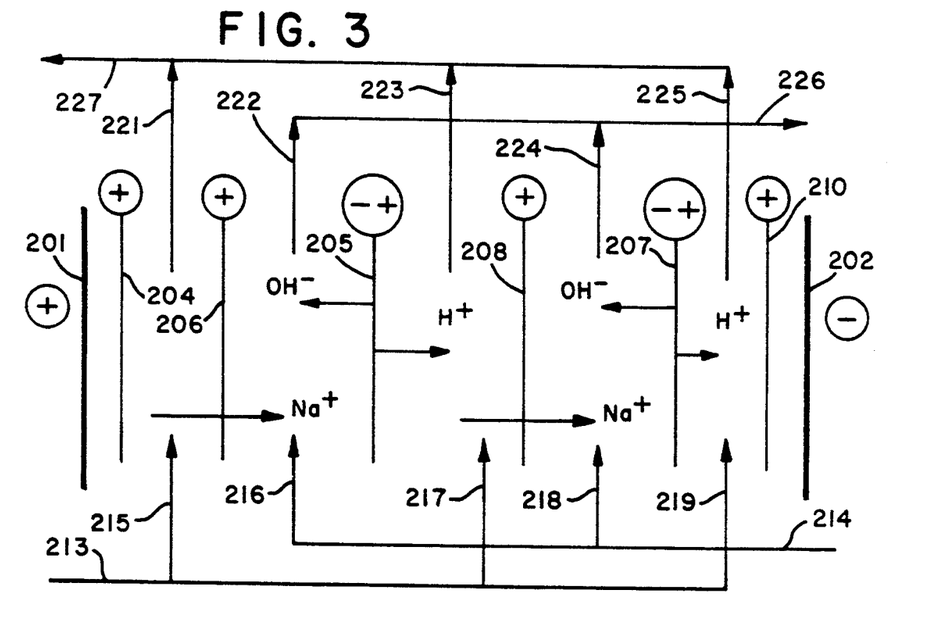
FIG. 3, is a schematic drawing of a base purification unit, which may be used to remove the excess base from an exhausted anion exchange resin regenerant.

Cation membranes, 204 and 210, separate the anode, 201, and cathode, 202, from the base purification cell. Alternating cation, 206,208, and bipolar membranes, 205, 207, are serially arranged between the anode and cathode. Each bipolar membrane has a cation and an anion layer, such that under the influence of a direct current, water at the bipolar membrane is split into $H^+$ and $OH^-$. Examples of such bipolar membranes are disclosed in U.S. Pat. No. 4,116,889, and made by Allied-Signal.

Under the influence of a direct current the cation membranes will allow cations to pass through but will act as a barrier to anions. Examples of suitable cation membranes are disclosed in U.S. Pat. No. 4,738,764 made by Allied-Signal, CMV cation membranes made by Asahi Glass, or Nafion ® membranes made by Dupont.

In operation, exhausted anion exchange regenerant is supplied to the base purification unit via line 213, and fed to the feed compartments via lines 215, 217 and 219. An aqueous solution is supplied to the base purification unit via line 214, and fed into the base purification compartments via lines 216 and 218. The aqueous solution is preferably water or a slightly basic solution. A direct current is passed across the electrodes, causing the ions in the solutions to migrate. Cations migrate across the cation membranes toward the cathode, and are trapped in the base purification compartments. Water at the bipolar membranes is split into $H^+$ and $OH^-$. In the base purification compartments the cations combine with hydroxide ions generated by the bipolar membranes to form base. The base is removed from the compartments via lines 222 and 224, and passes from the unit via line 226. The base depleted salt stream of the anion exchange regenerant is withdrawn from the feed compartments via lines 221, 223 and 225, and passes from the unit via line 227.

The base purification units of the present invention may be operated in any mode, i.e. continuous flow, batch, or feed and bleed.

Pretreatment, such as micro or ultrafiltration, of the exhausted anion exchange regenerant may be required to remove multivalent metals and dissolved organics. However, soluble organic contaminants are not usually a problem because no anion membranes are used in the base purification unit and the concentration of multivalent metals is generally low in the spent anion exchange regenerant. Thus, use of a base purification unit is a straight forward method to remove the excess alkali, while reducing overall stream volume.

Preferably, the base depleted salt stream is treated in the electrodialytic water splitter of FIG. 1 to recover useable acid and more base. Thus, the base depleted salt stream is fed to the water splitter of FIG. 1 via line 9, and into the salt feed compartment via line 10. The salt stream is preferably pretreated to remove impurities, either as described earlier, or by pH adjustment to precipitate out the silica. As before aqueous solutions are fed into the acid and base compartments, and an electrical current is passed between the electrodes. Cations migrate toward the cathode, and anions toward the anode. Thus, cations in the feed compartment migrate across cation membrane, 4, and into the adjoining base compartment, where they are trapped by bipolar membrane, 7. Likewise, anions migrate across anions membrane, 8, and into the adjoining acid compartment, where they are trapped by bipolar membrane, 6. The cations in the base compartment, and the anions in the acid compartment combine respectively with $OH^-$ and $H^+$ generated by bipolar membranes, 7 and 6, respectively. Thus, base is generated in the base compartment, and removed via lines 19 and 21, and passes from the system via line 23. The acid generated in the acid compartment is removed via lines 18 and 20, and passes from the system via line 22.

Figure 4:
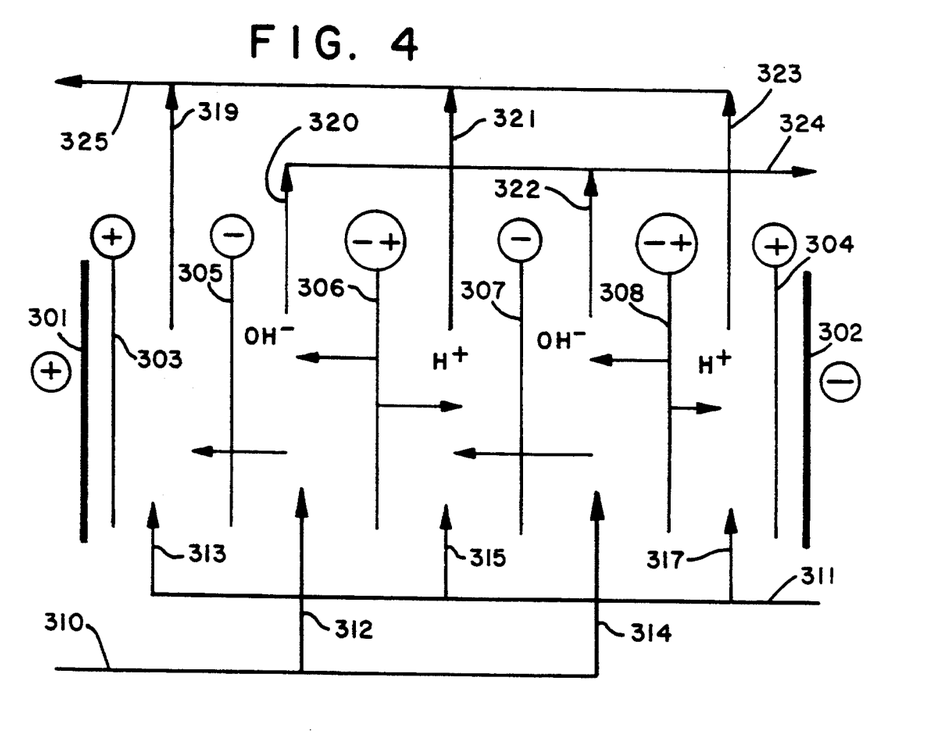
FIG. 4 is a schematic drawing of an acid purification unit, useful for removing the excess acid from an exhausted cation exchange resin regenerant.

For uses where only cation exchange columns are used, or where the amount of free acid in the spent regenerant exceeds about 20%, the cation exchange regenerant is preferably recovered via the acid purification unit of FIG. 4. The purification cell of the acid purification unit is formed by alternating anion and bipolar membranes arranged between an anode, 301, and a cathode, 302, which are secluded from the cell via cation membranes, 303 and 304, respectively. Each bipolar membrane has an anion layer and a cation layer, and is oriented so that the anion layers face the anode, and the cation layers face the cathode.

While the invention discloses a bipolar membrane to split water in the foregoing embodiments it should be understood by one skilled in the art that any configuration which is capable of splitting water under the influence of a direct current, such as spaced apart cation and anion exchange membranes may be used.

The exhausted cation exchange column regenerant may be pretreated prior to introduction into the acid purification unit to remove multivalent metals, dissolved organics, and suspended solids which are likely to cause fouling of the anion membranes in the acid purification unit. The filtered exhausted regenerant is fed to the unit via line 310, and into the feed compartments (bounded by anion membrane, 305, and bipolar membrane, 306; and anion membrane, 307, and bipolar membrane, 308) via inlet lines 312 and 314. An aqueous solution is fed to the unit via line 311, and into the acid product compartments via inlet lines 315, 313, and 317, to the respective acid purification compartments (located between the cation layer of bipolar membrane, 306, and anion membrane, 307; cation membrane, 303, and anion membrane, 305; and the cation layer of bipolar membrane, 308, and cation membrane, 304,). Preferably the aqueous solution is either water or a dilute acid solution.

A direct current is passed between the electrodes causing the anions to migrate toward the anode and the cations to migrate toward the cathode. Thus, anions migrate from the feed compartments into the product compartments and combine with the hydrogen ions which are introduced by the cation layer of the bipolar membrane. The resulting recovered free acid is withdrawn from the product compartments by lines 319, 321 and 323 and passes from the unit via line 325. The acid depleted exhausted cation exchange regenerant solution is withdrawn from the acid purification cell via lines 320, and 322, and passed from the unit via line 324.

The acid purification unit of the present invention may be operated in any mode known in the art, i.e. continuous flow, batch or feed and bleed.

Optionally, the acid depleted salt stream may be treated in the electrodialytic water splitter of FIG. 1 to recover useable base and more acid. Thus, the acid depleted salt stream is fed to the water splitter of FIG. 1 via line 9, and into the salt feed compartment via line 10. The water splitter is operated as discussed in reference to FIG. 1.

Figure 5:
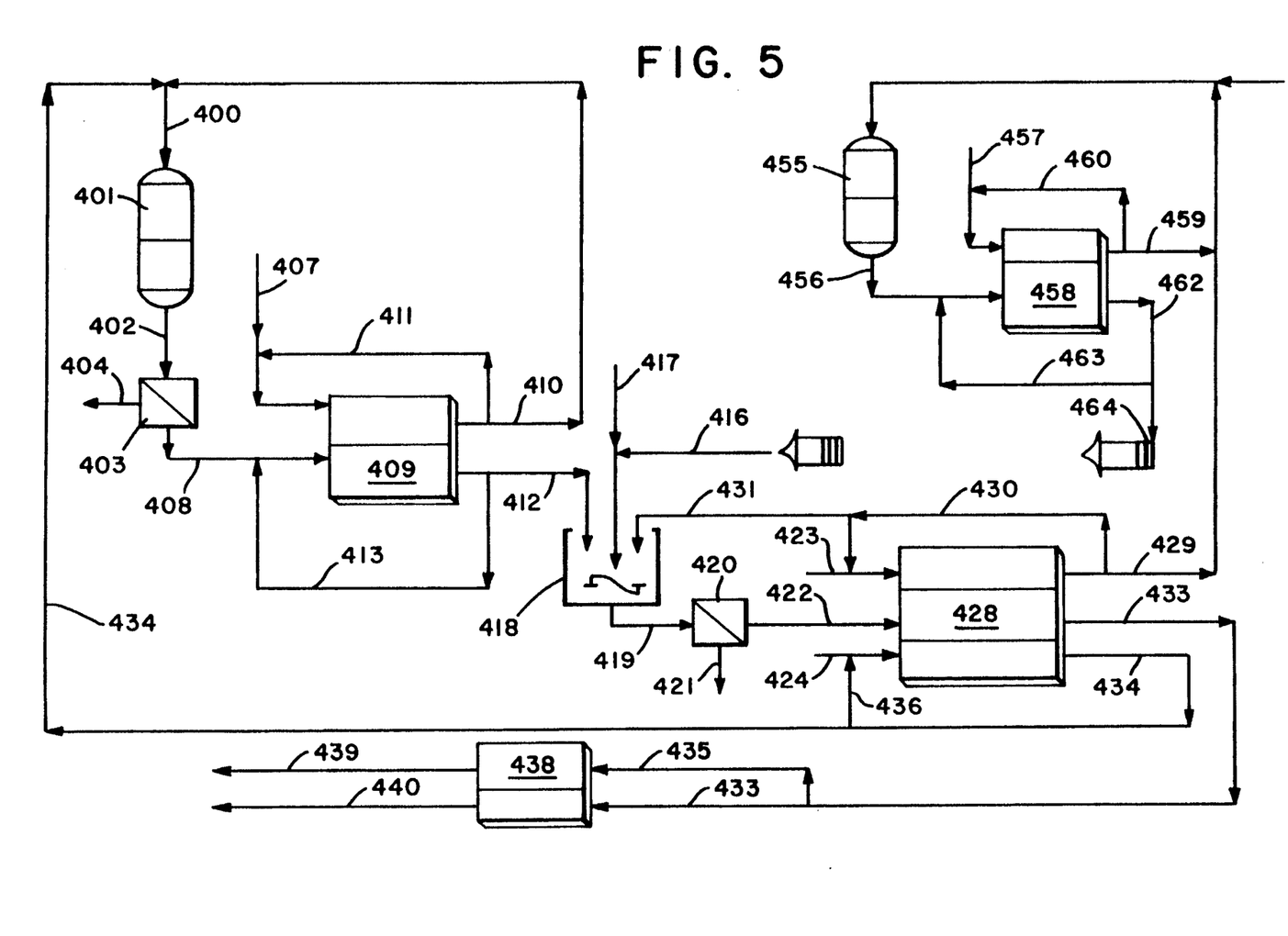
FIG. 5 is a schematic drawing of an alternate embodiment of the present invention which details the interconnection of the units represented in FIG. 1 through 4.

FIG. 5 illustrates a preferred flow scheme through the various process components of the present invention. Fresh anion exchange regenerant is introduced via line 400 into an exhausted anion exchange column, 401. The exhausted regenerant is removed via line 402 and the suspended solids are filtered out via filtration unit, 403, and removed from the system via line 404. The filtered, exhausted anion exchange regenerant is fed into the base purification unit, 409, via line 408. An aqueous solution, preferably water or a base solution, is fed into the base purification compartment, 409, via line 407. The free base is separated via base purification, which was depicted in detail in FIG. 3. The recovered base is withdrawn form the base purification unit via line 410. A portion of the recovered base may be recycled to the concentration compartment of the base purification unit via line 411. The remainder of the recovered base is recycled back to the anion exchange column via line 410.

The base depleted exhausted regenerant is removed from the base purification unit via line 412. A portion of the base depleted exhausted regenerant may be recycled, via line 413, to the exhausted anion exchange regenerant feed stream, 408, for further treatment in the base purification unit, 409. The remainder of the stream in line 412 is fed to a pH adjustment unit, 418. Makeup concentrated salt, and HCl/NaOH are optionally added to the pH adjustment unit via lines 416, and 417, respectively to maintain a pH of about 5 to about 6 so that the $SiO_2$ and $Al_2O_3$ will precipitate.

Following pH adjustment to 5 –6 in unit 418, the residual regenerant stream travels via line 419 to filtration unit, 420. Insoluble silicates are removed from the system via line 421. The base depleted regenerant is withdrawn from the silicate removal unit and fed into the salt compartment of the electrodialytic water splitter, 428, via line 422. Aqueous solutions, preferably water, dilute or recycled acid or base are fed respectively into the acid and base compartments via lines 423 and 424. The base depleted regenerant solution is split into its acid and base components in the electrodialytic water splitter, 428. FIG. 1 depicts a preferred configuration for the electrodialytic water splitter used in the process of the present invention.

The recovered acid is withdrawn via line 429. Part of the acid stream may be recycled back through the electrodialytic water splitter for further concentrating, via line 430. A portion of the acid in the recycle loop, 430, may be directed to the pH adjustment step, 418, via line 431.

The electrodialytically recovered acid which is not recycled for reconcentration is withdrawn via line 429, and may be used to regenerate cation exchange column, 455, or stored in an acid holding tank (not shown).

Base is recovered from electrodialytic water splitter, 428, via line 434. The base may either be directed back through the electrodialytic water splitter via line 436 for further concentration, or may be directed to anion exchange column, 401, via line 434. Recovered base may also be stored in a base storage tank (not shown).

The electrodialytically depleted salt may be withdrawn from the electrodialytic water splitter, 428, via line 433. The electrodialytically depleted salt may either be discarded, or treated to recover excess water by any suitable method such as a reverse osmosis unit (not shown), or electrodialysis unit, 438. A portion of the electrodialytically depleted salt stream is withdrawn from line 433 via line 435, and fed into the concentrating compartment of electrodialysis unit, 438, and the remainder of the depleted salt is introduced into the diluting compartment via line 433. Concentrated salt withdrawn via line 439, is preferably recycled to the water splitter, 428, to produce acid and base or is discarded. The recovered water, withdrawn via line 440, may be used to rinse the ion exchange columns, to adjust the concentration of the any of the recovered regenerants to the desired concentration (preferably about 3 –about 7 weight % , i.e. approximately 1–2N ) or may be discarded.

Exhausted cation exchange resin regenerant is withdrawn from cation exchange column, 455, via line 456. The exhausted cation exchange regenerant may be pretreated to remove organics, multivalent metal ions, and insoluble contaminants. The pretreated regenerant stream is introduced into the feed compartment of acid purification unit, 458, via line 456. An aqueous solution, preferably water or an acid solution, is fed into the acid purification compartment via line 457. Purified acid is recovered via line 459 and may either be recycled back for reconcentration via line 460, or may be combined with the acid recovered from the electrodialytic water splitter via line 429, and used to regenerate cation exchange column, 455, or may be passed to an acid holding tank (not shown).

The acid depleted exhausted cation resin regenerant is removed from the acid purification unit via line 462, and may either be discarded via line 464, or may be recycled back through the acid purification unit via line 463. The purge line, 464, contains all of the cation and anion species which were removed from the original ion exchange feed streams.

It has been surprisingly found that by electrodialytically treating only the exhausted anion regenerant the acid and base required to regenerant both anion and cation exchange columns may be regenerated in essentially the amounts required, in a minimum number of steps, thus minimizing the purchase and storage of regenerants. The spent regenerant solutions are not mixed together and exterior salt solutions are required only in small quantities for makeup. A typical anion exchange column effluent contains $NaCl$, $Na_2SO_4$, $Na_2SiO_3$, $NaOH$, $H_2O$, organics and color bodies. If the anionic effluent is treated independently, only two pretreatment steps are required, carbon treatment to remove organics and color bodies, and pH adjustment to 5–6 to control Si. Electrodialytic water splitting of the anion exchange effluent produces two equivalents of base for each mole of divalent hardness removed by the cation exchange column. When a three compartment water splitter is used a corresponding amount of acid is also produced. Regeneration of the anion and cation exchange resins requires two equivalent of base or acid respectively. Thus, the NaOH and acid generated by the water splitter are generated in essentially stoichiometric amounts. As no excess regenerant is produced, storage requirements are minimized. Moreover, because the regenerant solutions are not mixed prior to treatment, extraneous salt is not required for concentration adjustment. Thus, by treating only the anion exchange regenerant two pretreatment steps may be avoided (the first pH adjustment step and filtration to remove Ca), the need to purchase and store base, acid and/or salt is avoided, and the amount of solution which must be treated is cut in half.

For processes which use only a cation exchange column, an acid purification unit may be used. Accordingly, an alternate embodiment of the present invention includes an acid purification unit, 458. In the processes of the present invention, the purification units act as an integral part of the ion exchange regeneration process by removing the excess acid or base in the exhausted regenerant and recycling the recovered acid or base directly to the ion exchange columns, thus decreasing the amount of purchased regenerant required from an excess to an amount equivalent to the exchange capacity of the column or bed. Further acid and base may be recovered by adding a water splitter to the recovery portion of the regeneration process.

It should be noted that the process of the present invention allows great flexibility. For industrial uses which have only anion exchange columns, a base purification unit may be used with or without the electrodialytic water splitter and electrodialysis units. Correspondingly, for industrial uses which have both anion and cation exchange columns, an electrodialytic water splitter may be used to generate nearly all the acid and base to regenerate both columns from just the exhausted anionic regenerant. Acid and/or base purification units may be used in conjunction with the water splitter to increase the amount of product recovered. Make-up water may also be recovered from the depleted salts via an electrodialysis unit or a reverse osmosis unit. Accordingly, the process of the present invention maximizes recovery of resources (both in fresh regenerants and in make up water), as well as minimizes the amount of waste which must be discarded.

The following material balance data is representative of the process disclosed and claimed herein.

EXAMPLE 1

322.2 g/min of a solution containing 5.0 g/min NaCl, 10.7 g/min $Na_2SO_4$, 2.4 g/min NaOH, and 0.2 g/min $Na_2SiO_3$, representing exhausted regenerant solution from an anion exchange column, is fed into the feed compartments of the two compartment base purification unit shown in FIG. 3. 6 inch by 8 inch Aquatech Systems® bipolar and Nafion® cation membranes with effective surface areas of 0.125 ft² each are used to form an eight cell stack. Nafion® cation membranes are used to separate the electrodes from the cells.

41.13 g/min water is fed into the base compartments. The base purification unit is operated at 12.5 A (100 amps per square foot, ASF). The waste solution is processed in a continuous mode. Base depleted salt is removed from the feed compartment at a rate of 315.3 g/min, and recovered base is removed from the base compartments at a rate of 48.0 g/min.

The base product stream contains 2.4 g/min NaOH and 45.6 g/min water. All of the salts (NaCl, $Na_2SO_4$ and $Na_2SiO_3$) remain in the feed stream. Accordingly, the free base is recovered.

EXAMPLE 2

An exhausted ion exchange regeneration stream is pretreated to remove insoluble silicates. 63.7 g/min of the exhausted regenerant having 1.1 g/min NaCl, 2.8 g/min $Na_2SO_4$, and 0.1 g/min HCl is fed into the salt compartment of the three compartment water splitter of FIG. 1, having 8 cells. Alternating Nafion® cation membrane, Aquatech Systems® bipolar and anion membranes, each with effective surface areas of 0.125 ft² are used to form an eight cell stack. Nafion® cation membranes are used to separate the electrodes from the cells. 41.3 g/min and 41.7 g/min water are fed into the base and acid compartments respectively.

The water splitter is operated at 12.5 A (100 ASF), and the exhausted regenerant is processed in a continuous mode. 45.6 g/min base, containing 1.7 g/min NaOH, is withdrawn from the base compartment, 45.7 g/min acid, containing 0.1 g/min NaCl, 0.7 g/min HCl, and 1.3 g/min $H_2SO_4$, is removed from the acid compartment, and 55.4 g/min depleted salt solution, containing 1.0 g/min $Na_2SO_4$, is withdrawn from the feed compartment. Accordingly, 4.4 wt. % acid and 3.7 wt. % base are recovered from the salt solution.

EXAMPLE 3

A depleted salt stream, like the depleted salt stream withdrawn from the electrodialytic water splitter of Example 2, is fed into the electrodialysis unit of FIG. 2 to remove excess water from the depleted salt stream. 102.0 g/min of a depleted salt stream containing 1.8 g/min $Na_2SO_4$ is fed into the electrodialysis unit of FIG. 2. Alternating Nafion® cation membranes, and Aquatech Systems® anion membranes having a effective surface area of 0.125 ft² each are used to form an eight cell stack, and Nafion® cation membranes of the same size are used to separate the electrodes from the cell stack. The stack is operated at 5 A (40 ASF), and the depleted salt is processed in continuous mode. 90.7 g/min recovered water, containing 0.1 g/min $Na_2SO_4$, is withdrawn from the diluting compartment, and 11.4 g/min concentrated salt, containing 1.7 g/min $Na_2SO_4$ (approximately 15 wt. %), is withdrawn from the concentrating compartment.

EXAMPLE 4

183.7 g/min spent acid regenerant, containing 2.8 g/min NaCl, 2.2 g/min HCl, 3.0 g/min $CaSO_4$, 1.0 g/min $MgSO_4$, 0.3 g/min $MgCl_2$, is fed to the feed compartments of the acid purification unit of FIG. 4. 57.7 g/min water is fed to the acid compartments. Alternating Aquatech Systems® bipolar membranes and anion membranes, each having an effective surface area of 0.125 ft² are used to make up an eight cell stack, and Nafion® cation membranes of the same size separate the electrodes from the cell stack. The stack is operated at 12.5 A (100 ASF), and the spent acid regenerant is processed in continuous mode.

62.1 g/min recovered acid, containing 0.1 g/min NaCl, and 2.1 g/min HCl, is withdrawn from the acid compartment, and 179.3 g/min acid depleted salt (purge stream), containing 2.7 g/min NaCl, 0.1 g/min HCl, 3.0 g/min $CaSO_4$, 1.0 g/min $MgSO_4$, and 0.3 g/min $MgCl_2$ is withdrawn from the feed compartment. Accordingly, the free acid present in the spent acid regenerant is recovered.

EXAMPLE 5

A 150 l cation exchange column is regenerated on a 16 hour cycle with 265.6 g/min of a 5% acid solution (3.99 g/min HCl and 9.29 g/min $H_2SO_4$ and is washed with 52.4 g/min water (16 hour cycle). The spent cation regenerant (322.2 g/min, containing 0.22 $Na_2SO_4$, 5.1 g/min $MgSO_4$, 2.81 g/min $CaSO_4$, 6.06 g/min $CaCl_2$ and 2.94 g/min $H_2SO_4$) is neutralized with 2.22 g/min lime and discarded as a non-hazardous waste.

A 300 liter anion exchange column is regenerated with 239.2 g/min. of a 5% base solution (11.96 g/min NaOH) and is washed with 72.7 g/min water (16 hour cycle). The spent regenerant (322.2 g/min, containing 5.0 g/min NaCl, 10.7 g/min $Na_2SO_4$, 2.4 g/min NaOH, 0.2 g/min $Na_2SiO_3$ and a small amount of caustic) is pH adjusted with 56.3 g/min acid (0.832 g/min HCl, 1.983 g/min $H_2SO_4$), and the $SiO_2$ is filtered off. The filtrate (378.4 g/min, containing 6.33 g/min NaCl and 13.57 g/min $Na_2SO_4$) and is treated in a reverse osmosis unit to remove the excess water (327.86 g/min). The recovered water may be used as wash water for the ion exchange columns and as part of the acid and base feed to the water splitter. The concentrated, pretreated spent regenerant is fed to the feed compartments of the water splitter described in Example 2. Water (212.62 g/min and 239.66 g/min) is fed to the acid and base compartments respectively. The water splitter is operated at 12.5 A (100 ASF), and the exhausted regenerant is processed in a continuous mode. Approximately 5% base (11.96 g/min NaOH) is withdrawn from the base compartment at a rate of 239.2 g/min. A 5% acid solution (3.95 g/min HCl and 9.37 g/min $H_2SO_4$) is removed from the acid compartment at a rate of 266.3 g/min. The depleted feed stream is recycled to the water removal step to increase water recovery.

COMPARATIVE EXAMPLE

The cation and anion exchange columns are regenerated as in Example 5. The spent cation regenerant (322.2 g/min, containing 0.22 $Na_2SO_4$, 5.1 g/min $MgSO_4$, 2.81 g/min $CaSO_4$, 6.06 g/min $CaCl_2$ and 2.94 g/min $H_2SO_4$) is mixed with the spent anion regenerant (322.2 g/min, containing 5.0 g/min NaCl, 10.7 g/min $Na_2SO_4$, 2.4 g/min NaOH, 0.2 g/min $Na_2SiO_3$ and a small amount of caustic) to form the salt stream (15.18 g/min $Na_2SO_4$, 5 g/min NaCl, 5.1 g/min $MgSO_4$, 3.05 g/min $CaSO_4$, 5.86 g/min $CaCl_2$ and 0.2 g/min $Na_2SiO_3$) to be treated in the electrodialytic water splitter.

The mixed regenerant stream is pH adjusted with 196.4 g/min 5% base (9.82 NaOH) to precipitate the Ca and Mg, which are filtered out as 2.46 g/min $Mg(OH)_2$, 5.57 g/min $Ca(OH)_2$, 0.2 g/min NaCl and 0.6 $Na_2SO_4$.

The filtered regenerant stream (814.1 g/min) is pH adjusted with 12.2 g/min of 5% acid (0.832 g/min HCl, 1,983 g/min $H_2SO_2$), and the $SiO_2$ is filtered off.

The concentration of the filtrate (826.3 g/min, containing 11.25 g/min NaCl and 24.39 $Na_2SO_4$) is adjusted to 6% salt by adding 4.68 g/min NaCl and 10.16 g/min $Na_2SO_4$). The concentrated, pretreated spent regenerant is fed to the feed compartments of the water splitter described in Example 2. Water (429.3 g/min and 377.17 g/min) is fed to the acid and base compartments respectively. The water splitter is operated at 12.5 A (100 ASF), and the exhausted regenerant is processed in a continuous mode. Approximately 5% base (21.43 g/min NaOH) is withdrawn from the base compartment at a rate of 428.6 g/min. A 5% acid solution (7.02 g/min HCl and 16.83 g/min $H_2SO_4$) is removed from the acid compartment at a rate of 477 g/min. A 2% salt stream (14.84 g/min) is withdrawn from the feed compartment at a rate of 742 g/min. All of the depleteded salt stream must be discarded to maintain the water balance in the process.

The amounts of acid and base which are produced and used (for regeneration and pretreatment) and the volume of solution which must be treated in the water splitter in Example 5 and Comparative Example are compared in Table 1, below. All values are in g/min.

TABLE 1

| EX. NO. | Acid Prod. | Acid Used | Base Prod. | Base Used | salt reqd | Vol. soln. |
|---|---|---|---|---|---|---|
| Ex. 5 | 266.3 | 321.9 | 239.2 | 239.2 | 0 | <400 |
| Comp. Ex | 477 | 277.8 | 428.6 | 435.6 | 14.8 | >800 |

Thus, it can be seen that by using the process of the present invention no salt and very little regenerant needs to be purchased (55.6 g/min 5% acid, or 52.95 kg/cycle/column) and stored. However, the prior art process produces nearly twice as much acid as is used in the process. Thus, 200 g/min (192 kg/cycle/column) acid must be stored and or further processed for sale. Salt (14.84 g/min or 14.25 kg/cycle/column) must also be purchased and stored. Moreover, the process of Comparative Example requires an extra pretreatment step, and processing twice as much solution through the water splitter, which results in an increase in processing cost as well as a decrease in membrane life. The process of the present invention also recycles water thereby reducing the quantity of waste and decreasing the exterior water requirements (249.52 g/min, 239.54 kg/cycle/column versus 983.57 g/min, 944.23 kg/cycle/column). Only the exhausted cation regenerant (322.2 g/min, 309.3 kg/cycle) is discarded in the present invention. However, as discussed above, to maintain a water balance in the prior art process, all of the depleted salt must be discarded (742 g/min or 712.32 kg/cycle). Thus, by regenerating only the anion regenerant the process of the present invention produces half the waste, requires one fourth the water, greatly reduces storage and chemical makeup requirements, and eliminates the need to purchase solid salt.

Alternatively, if excess acid is desirable, the salt addition/circulating salt stream of the prior art may be replaced by a water removal unit, such as a reverse osmosis unit or an electrodialysis unit. While the water removal/water splitting process would still require an additional pretreatment step, 727.17 g/min (698.08 kg/cycle) water is recovered leaving only 256.4 g/min (246.1 kg/cycle) water required as makeup. Moreover, a minimum amount of waste (5% of the feed stream) is discarded as purge.

The foregoing examples are exemplary only. The true scope and meaning of the present invention is determined by the appended claims.

What is claimed is:

1. A method for recovering acid and base from exhausted resin regenerant consisting essentially of anion resin regenerant comprising:

withdrawing said exhausted anion resin regenerant from an anion exchange column;

subjecting said exhausted anion resin regenerant to treatment in a three compartment electrodialytic water splitter having at least one bipolar ion exchange membrane to produce an electrodialytically depleted regenerant solution and an amount of acid and base which is about equal to the amount required to regenerate said anion exchange column and a cation exchange column.

2. The method of claim 1 wherein said anion exchange column is regenerated with said base and said cation exchange column is regenerated with said acid.

3. The method of claim 1 wherein excess water is removed from said exhausted anion exchange regenerant before treatment in said electrodialytic water splitter.

4. The method of claim 3 wherein said water is removed by reverse osmosis or electrodialysis.

5. The method of claim 1 wherein said exhausted anion exchange regenerant is treated in a base purification unit to recover free base and a free base depleted regenerant stream which is treated in said electrodialytic water splitter.

6. A method comprising the steps of:
providing a three compartment electrodialytic water splitter having an anode and a cathode, and between said anode and cathode at least one anion membrane and at least one cation membrane, disposed between at least two bipolar membranes, each bipolar membrane having a cation layer and an anion layer, wherein said anion layers of said bipolar membranes face said anode, and said anion membrane and said cation membrane are arranged such that there is an acid compartment formed between said cation layer of the first bipolar membrane, and said anion membrane, a salt compartment formed between said anion membrane and said cation membrane and a base compartment formed between said cation membrane and anion layer of the second bipolar membrane;

pretreating an exhausted regenerant solution chosen from the group consisting of anionic and cationic regenerant solutions to remove at least one impurity chosen from the group consisting of insoluble contaminants, multivalent metals, and dissolved organics;

feeding said pretreated regenerant solution into said salt compartment;

feeding a first aqueous solution into said base compartment;

feeding a second aqueous solution into said acid compartment;

applying sufficient current across said electrodialytic water splitter to cause the migration of anions into said electrodialytic acid compartment, the migration of cations into said electrodialytic base compartment, and the splitting of water into $H^+$ and $OH^-$ at the bipolar membranes;

withdrawing an acid product stream from said acid compartment;

withdrawing a base product stream from said base compartment;

withdrawing an electrodialytically depleted regenerant solution from said salt compartment; and regenerating an ion exchange column with a product stream chosen from the group consisting of said base product stream, and said acid product stream.

7. The method of claim 6 further comprising the step of removing the excess water from said pretreated, exhausted regenerant via either an electrodialysis unit or a reverse osmosis unit.

8. The method of claim 6 wherein said pretreated regenerant solution comprises anionic regenerant solution and said base product stream is used to regenerate an anion exchange column and said acid product stream is used to regenerate a cation exchange column.

9. The method of claim 8 further comprising the step of feeding said exhausted anion regenerant solution to a base purification unit to produce a free base and a base depleted salt stream; and feeding said base depleted salt stream to said salt compartment of said three compartment water splitter.

10. The method of claim 6 wherein said pretreated regenerant solution comprises cationic regenerant solution and said base product stream is used to regenerate an anion exchange column and said acid product stream is used to regenerate a cation exchange column.

11. A method for recovering exhausted anion exchange regenerant comprising the steps of:
withdrawing said exhausted anion exchange regenerant from an anion exchange column;

pretreating said exhausted anion exchange regenerant to remove at least one contaminant selected from the group consisting of multivalent metals, dissolved organics and insoluble contaminants;

feeding said exhausted anion exchange regenerant to a base purification unit having an anode and a cathode, and between said anode and said cathode having at least two bipolar membranes alternating with at least one cation membrane, each bipolar membrane having a cation layer and an anion layer, arranged so that said anion layers face the anode, and said cation layers face the cathode, such that there is a waste regenerant feed compartment between said cation layer of said first bipolar membrane and said cation membrane, and a base purification compartment between said cation membrane and said anion layer of said second bipolar membrane;

applying sufficient current across said base purification unit to cause the migration of cations across said cation membrane and into a base purification compartment, and the splitting of water into $H^+$ and $OH^-$ at the bipolar membranes;

withdrawing purified base from said base purification compartment;

withdrawing a base depleted salt stream from said waste regenerant feed compartment; and feeding the purified base to said anion exchange column.

12. The method of claim 11 wherein said base depleted salt stream is subjected to treatment in a three compartment electrodialytic water splitter to produce a second base product stream, an acid product stream and an electrodialytically depleted salt stream.

13. A method for recovering exhausted cation exchange regenerant comprising the steps of:
withdrawing an exhausted cation exchange regenerant from a cation exchange column;

feeding said exhausted cation exchange regenerant to an acid purification unit having an anode and a cathode, and at least one anion membrane disposed between at least two bipolar membranes, each bipolar membrane having a cation layer and an anion layer, arranged so that all the membranes are between said anode and said cathode and said anion layers of said bipolar membrane face said anode, arranged to form an acid waste regenerant feed compartment between said anion layer of said second bipolar membrane and said anion membrane, and an acid purification compartment between said anion membrane and said cation layer of said first bipolar membrane;

applying sufficient current across said acid purification unit to cause the migration of anions across said anion membrane and into said acid purification compartment, and the splitting of water into $H^+$ and $OH^-$ at the bipolar membranes;

withdrawing a purified acid stream from said acid purification compartment;

withdrawing an acid depleted salt stream from said acid waste regenerant feed compartment;

feeding said purified acid stream to said cation exchange column.

14. A method for recovering acid and base from exhausted resin regenerant comprising:

withdrawing said exhausted resin regenerant from either a cation exchange column or an anion exchange column;

concentrating said exhausted resin regenerant by removing water therefrom;

subjecting said concentrated exhausted resin regenerant to treatment in a three compartment electrodialytic water splitter having at least one bipolar ion exchange membrane to produce an electrodialytically depleted regenerant solution and an amount of acid and base which is about equal to the amount required to regenerate said anion exchange column and a cation exchange column.

15. The method of claim 14 wherein said concentrating step is accomplished via a reverse osmosis unit or an electrodialysis unit.

* * * * *